April 20, 1965 W. C. SHEEHAN 3,179,532
ANCHOR COATING OF A WATER-SOLUBLE SALT OF A
COPOLYMER OF AN ACRYLATE AND AN
ACRYLIC ESTER
Filed April 25, 1960

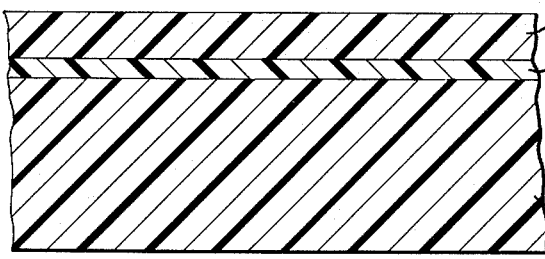

ORGANIC POLYMER, E.G, VINYLIDENE CHLORIDE.

WATER-SOLUBLE SALT OF COPOLYMER OF A DIALKYL-AMINOETHYL ACRYLATE AND AN ACRYLIC ESTER.

HYDROPHILIC ORGANIC POLYMERIC MATERIAL, E.G., REGENERATED CELLULOSE FILM.

INVENTOR
WILLIAM CALLOWAY SHEEHAN

BY John E. Griffiths
ATTORNEY

# United States Patent Office 3,179,532
Patented Apr. 20, 1965

3,179,532
ANCHOR COATING OF A WATER-SOLUBLE SALT OF A COPOLYMER OF AN ACRYLATE AND AN ACRYLIC ESTER
William Calloway Sheehan, Birmingham, Ala., assignor to E. I. du Pont de Nemours and Company, Wilmington, Del., a corporation of Delaware
Filed Apr. 25, 1960, Ser. No. 24,233
18 Claims. (Cl. 117—76)

This invention relates to the coating of continuous webs. More particularly, it relates to a process for uniformly coating continuous, flexible, transparent webs of hydrophilic organic polymeric materials such as regenerated cellulose film with an aqueous dispersion of the coating composition.

The coating of a continuous regenerated cellulose film is usually carried out by first passing the film through a dip tank containing the liquid coating composition, then through a doctoring device to regulate the amount of coating composition retained on the surface of the film, then through a smoothing device to smooth and thus improve the appearance of the coating and, finally, through a drying zone, all steps being performed in a continuous manner. This process worked successfully for coating compositions which were dissolved in organic solvents.

However, the use of organic solvents is expensive. The solvent must be evaporated, then wasted to the atmosphere or recovered in special equipment. Water and the use of aqueous dispersions of the coating would seem to be a logical improvement.

The application of polymeric coatings, such as vinylidene chloride copolymer coatings, from aqueous dispersions of the copolymer, however, poses several new problems. The most important is a defectively coated film. The defects in the coating appear as striations, i.e., minute grooves or channels in the coating in a series of substantially parallel lines. It is believed that these striations result from a combination of the high solids content in the aqueous dispersion coating baths and the rapid imbibition of the water dispersant into the hydrophilic base film. The latter, particularly, tends to dehydrate the coating and, hence, tends to accelerate hardening before the smoothing operation can be completed effectively.

Expedients heretofore employed to smooth the coating before it sets or hardens are generally found to be inadequate and do not eliminate the aforementioned striations. Either they do not function effectively within the short period of time available between the point at which the coating is metered on the base film and the point at which the coating has become too hard; or the device used for smoothing may impose too much drag on the film causing other marks on the coating and, in many instances, causing the film to tear.

An object of the present invention is a process for the aqueous dispersion coating of continuous, flexible articles of hydrophilic organic polymeric material which overcomes the difficulties noted above. A further object is a continuous process for forming a uniform, smooth coating containing a coalescible vinylidene chloride copolymer on regenerated cellulose film using aqueous dispersion coating techniques. Other objects will appear hereinafter.

The objects are accomplished by applying to the hydrophilic organic polymeric article while it is in the form of a wet gel prior to initial drying thereof an aqueous solution containing a water-soluble salt of a polymer obtained from 20 to 30 percent by weight of at least one dialkylaminoethyl acrylate having the formula

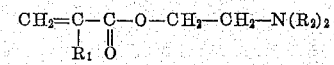

and 70 to 80 percent by weight of at least one acrylic ester having the formula

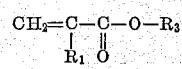

wherein
$R_1$ is selected from the group consisting of hydrogen and methyl,
$R_2$ is an alkyl group of 1–6, preferably 1–4, carbon atoms,
$R_3$ is selected from the group consisting of methyl, pinacolyl, tertiary butyl and neopentyl, the polymer having an inherent viscosity of 0.1–1.0, the salt being formed with a fatty acid having up to six, preferably up to four, carbon atoms (formic, acetic, propionic, butyric, valeric and caproic acids); removing excess treating medium; and, thereafter, heating the polymeric article under controlled conditions of temperature and time to dry the article and insolubilize the polymer; and then applying to the article a film-forming polymer from an aqueous dispersion thereof.

The most desirable results are obtained when the polymer is obtained from 20 to 30 percent by weight of at least one dialkylaminoethyl acrylate having the formula

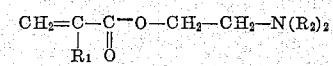

70 to 80 percent by weight of at least one acrylic ester having the formula

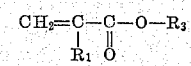

and 5 to 15 percent, based on the weight of the dialkylaminoethyl acrylate and the acrylic ester, of at least one epoxized acrylic ester having the formula

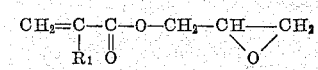

The process comprises treating a gel regenerated cellulose film with an aqueous solution containing 1%–10% of the water-soluble polymeric salt described previously, to impregnate said film with 0.1–3.75 grams/square meter of said water-soluble polymeric salt; heating the treated film to a temperature of 85° C.–120° C. for a time between 0.5 and 5.0 minutes, said time being sufficient to convert said water-soluble polymeric salt to 0.1–3.0 grams/square meter of the insoluble polymer; thereafter, coating the treated film with an aqueous dispersion containing 5%–65% of a coalescible, organic, polymeric, film-forming material, preferably a copolymer of vinylidene chloride with at least one other mono-olefinic monomer copolymerizable with vinylidene chloride; removing excess dispersion from the regenerated cellulose film; smoothing said dispersion on the surface of the regenerated cellulose film and drying the coated film.

The process of this invention is described with specific reference to the coating of regenerated cellulose film with an aqueous dispersion of a vinylidene chloride copolymer. However, the invention is applicable to other shaped articles and other polymeric base materials. Thus, the invention is applicable to tubes, filaments, etc., as well as sheets, pellicles, webs and films. The articles may be composed of cellulosic materials such as regenerated cellulose prepared from solutions of cellulose xanthate or cuprammonium cellulose, or they may be of a cellulose ester or ether such as cellulose acetate, cellulose nitrate, ethyl cellulose, methyl cellulose, hydroxyethyl cellulose, hydroxypropyl cellulose, paper, etc., which materials contain free hydroxyl groups and are hydrophilic in character. Certain non-cellulosic materials such as polyvinyl alcohol and partially hydrolyzed ethylene-vinyl acetate copolymers also fit within this definition of hydrophilic organic polymeric materials and are operable in the present invention. The articles to be treated may be modified by the addition of plasticizers, softeners, dyes, pigments, sizes, fillers, etc.

The treated articles obtained in accordance with the process of the invention may be coated with any suitable film-forming agent or composition, particularly with such agent or composition in an aqueous dispersion. The process is well adapted for applying an aqueous dispersion of a vinylidene chloride copolymer to control the degree of moisture resistance and/or the gas permeability and/or the heat-sealability and/or any other similar property of the base material.

A representative embodiment of this invention is illustrated in the accompanying drawing which is a cross-sectional view of one product of this invention with self-explanatory legends identifying the three-component article, wherein the top layer is an organic polymer, e.g. vinylidene chloride; the intermediate layer is a water-soluble salt of a copolymer of a dialkylaminoethyl acrylate and an acrylic ester; and the base layer is a hydrophilic organic polymeric material, e.g., regenerated cellulose film.

To achieve the results of the present invention, a hydrophilic polymeric article that can be effectively coated with an aqueous dispersion of a film-forming polymer, it is critical to impregnate the article with a material that will make the hydrophilic article substantially hydrophobic but will not affect the remaining properties of the article adversely. This is achieved in the present invention by impregnating with a polymeric salt that is water-soluble so that it can enter the hydrophilic article rapidly but which is then easily converted to an insoluble form to prevent any substantial entry of additional moisture. The hydrophobic nature of the article impregnated with the substantially insoluble polymer is characterized by the article's low wettability and its low swelling in water. Specifically, it has been discovered that an impregnated dried film, i.e., a film containing the insoluble polymer, must exhibit a contact angle upon wetting with water of less than 75 degrees and an initial rate of thickness swelling of less than 4.5% per second in water.

Hence, prior to coating, the article may be described as a hydrophilic organic polymeric article, preferably a cellulosic article, containing 0.1–3.0 grams/square meter of an insoluble polymer having an inherent viscosity of 0.1–1.0 and obtained from 20 to 30 percent by weight of at least one dialkylaminoethyl acrylate having the formula

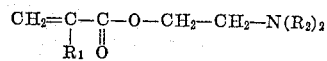

70 to 80 percent by weight of at least one acrylic ester having the formula

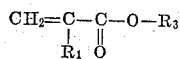

preferably also 5 to 15 percent, based on the weight of the dialkylaminoethyl acrylate and the acrylic ester, of at least one epoxized acrylic ester having the formula

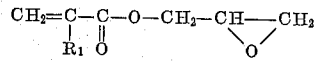

characterized by a contact angle upon wetting with water of less than 75 degrees and an initial rate of thickness swelling of less than 4.5% per second in water.

The method employed to measure the average initial rate of thickness swelling involves first cutting 15 one-inch squares from the film to obtain a representative sample. One of the squares is then placed on a platform of an "Ames" gauge and its thickness is measured. Three or four drops of an aqueous solution of a wetting agent is placed on the surface of the film and the thickness measured at the end of various time intervals. The platform is dried after each series of determinations. The solution used is prepared by dissolving 3 grams of "Santomerse" 3 [1] paste in one liter of distilled water. measurements are made at room temperature. The average initial rate of swelling is computed from the initial thickness and the thickness after 5 seconds (called 5-second interval) or after 15 seconds (called 15-second interval). Results are expressed as average percent swelling per second.

The contact angle of wetting is the angle measured in the liquid water interface formed by a line drawn tangential to the point at which the three phases, film, liquid and air, make contact. A definition and explanation of contact angle can be found on page 482 of Samuel Glastone's "Textbook of Physical Chemistry," D. Van Nostrand Co., Inc., New York, N.Y. (1946). It has been found that when the film exhibits a contact angle above 75 degrees, the wettability of the film by the subsequently applied aqueous coating dispersion is impaired; uniform weetability and consequent uniform application of the coating dispersion is not realized.

The polymers used in the form of their salts in the special treatment of the present invention are produced in accordance with methods well known to those skilled in the art. Thus, the acrylic ester copolymers may be prepared through the use of azo catalysts, following the general procedures described in U.S. Patent 2,471,959 to M. Hunt. Typical azo catalysts that are operable in these copolymerizations include alpha,alpha'-azobisisobutyronitrile, alpha,alpha'-azobis(alpha-gamma-dimethyl-valeronitrile), dimethyl alpha,alpha'-azodiisobutyrate, 1,1'-azodicyclohexanecarbonitrile, alpha,alpha' - azobis(alpha-methylbutyronitrile) and alpha,alpha' - azodiisobutyrocarbonamide.

Conventional peroxide-type catalysts may also be employed. These include benzoyl peroxide, di-tertiary-butyl peroxide, di - tertiary - butyl peroxydicarbonate, 2,2-bis-(tertiarybutylperoxy)butane, dimethyl dioxide, diethyl dioxide, dipropyl dioxide, propylether dioxide and propylmethyl dioxide. Organic hydroperoxides such as tertiary-butyl hydroperoxide, cumene hydroperoxide and ethyl hydroperoxide can also be used. (Schildknecht: Vinyl and Related Polymers, Wiley, 1952, ch. IV.)

It is considered that the catalyst or "initiator," whether it be the peroxide or azo type, functions by generating free radicals. The free radical combines with a polymerizable monomer to form a new free radical; the new free radical repeats the process until there is propagated a long polymer chain, as is known in the art. The polymer chain growth terminates when the free radical-bearing polymer fragment encounters another free radical, which, for example, may be another growing polymer chain or an initiator free radical.

The polymerizations can be carried out in a solvent such as acetone, methyl ethyl ketone and other aliphatic ketones, ethers such as diethyl ether, dipropyl ether and dimethoxyethylene glycol. Alternatively, the polymerizations may be carried out in bulk, or in aqueous dispersion systems. A temperature range of 0° C. to 250° C. can be used; the range of 30° C. to 110° C. is preferred. The reactions can be carried out at atmospheric or above atmospheric pressure and the process can be conducted batchwise or in a continuous manner. In some cases it is convenient to initiate the reaction solely by the action of heat or light.

[1] Sodium dodecyl benzene sulfonate manufactured by Monsanto Chemical Co.

In any event, the polymers used must have a relatively high molecular weight. The molecular weight should correspond to inherent viscosities of 0.1 to 1.0 in order to operate in the present invention. Those polymers with inherent viscosities of 0.2 to 0.6 are preferred. The determination of inherent viscosity is carried out with 0.5 gram of the polymer dissolved in 100 milliliters of acetone at 30° C. in accordance with the procedure described by L. H. Cragg in the Journal of Colloid Science, I, 261–269 (1946).

The fatty acid salt of the polymer may be used in a separate treating solution or, preferably, the salt may be incorporated in the aqueous softening bath such as the glycerol or ethylene glycol bath used in the conventional casting procedure for manufacturing regenerated cellulose film. In either case, the polymeric salt is impregnated into the regenerated cellulose film prior to the initial drying of the film while the film is in the form of a wet gel. Sufficient salt should be used to provide 0.1–3.0 grams of final polymer per square meter of dried film. At least 0.1 gram per square meter is necessary to provide smooth, even coating of aqueous dispersions containing a low amount of the coating resin. More than 3.0 grams per square meter tends to make the film surface more difficult to wet uniformly upon application of the aqueous coating dispersions. The salt should be soluble to the extent of at least 5% and can be used in concentrations of 1% to 5% or more in a 10% aqueous solution of the acid. It may be used in the form of a bath in which the film or other article is dipped or the salt solution may be sprayed or brushed on the article. The method of treatment is not critical as long as it effects the required amount of impregnation.

After the excess has been removed and the film has been dried and the polymer has been converted to its insoluble form in the film by heating to a temperature of at least 85° C., the film is coated with the aqueous dispersion of the film-forming resin. It is obvious that the invention will be useful whenever an aqueous dispersion of an organic, coalescible, polymeric, film-former is being applied as a coating to a hydrophilic base and premature hardening of the film-former is a problem. Some useful coating compositions are disclosed in U.S. Patents 2,819,984, 2,805,963, 2,748,027, 2,744,080 and 2,570,478. The use of aqueous dispersions of vinylidene chloride copolymers as coating compositions are particularly useful because of the importance of such copolymers as .00003″–.0008″ thick coatings in imparting moisture resistance and heat-sealability to regenerated cellulose film. Such vinylidene chloride copolymers are obtained from at least 80% vinylidene chloride monomer, the remainder being at least one other mono-olefinic monomer copolymerizable with vinylidene chloride. While copolymers of vinylidene chloride with methyl acrylate are illustrated in the subsequent embodiments of the invention, other mono-olefinic monomers copolymerizable with vinylidene chloride may be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2=C<$ group, the most useful ones falling within the general formula

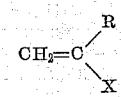

where R may be hydrogen, a halogen or a saturated aliphatic radical and X is selected from one of the following groups:

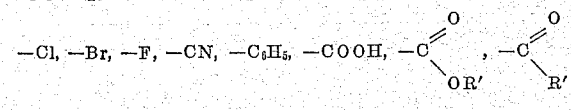

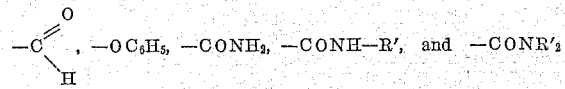

in which R' is alkyl. Unsaturated aliphatic acids such as itaconic acid, acrylic acid and methacrylic acid may be advantageously used in the preparation of the coating compositions.

The aqueous dispersion coatings may be applied in accordance with any known coating techniques. They may be applied by passing the film through baths in a continuous manner or in a batch manner. The coatings may also be sprayed onto the film or applied by brushing or the like. Ordinarily, the coatings are applied at room temperature.

The invention will be more clearly understood by referring to the examples which follow. Example 1 representing the best mode contemplated for carrying out the invention.

Example 1

A viscose solution was extruded through a slotted hopper into a solution of sulfuric acid and sodium sulfate to form a gel regenerated cellulose film in the conventional manner. After being washed, desulfured and bleached, the gel film which was 0.003 inch thick was passed prior to drying through an aqueous bath containing 7% ethylene glycol as a softener, and 5% of the acetate salt of a 2-diethylaminoethyl methacrylate/methyl methacrylate/glycidyl methacrylate terpolymer. The preparation of the salt is described below. Excess solution was removed from the film by passing the film through squeeze rolls. The continuous film was then dried by passing through heated rolls of a conventional drier where it was exposed to a temperature of 100° C. for a period of 5 minutes. The dried film, 0.001 inch thick, contained 0.62 gram/square meter of the polymer, displayed an initial rate of swelling of 1% per second and a contact angle of 68 degrees.

The terpolymer had been prepared by solution polymerization in acetone using an azo catalyst. To a solution of 25 grams of 2-diethylaminoethyl methacrylate, 75 grams of methyl methacrylate and 10 grams of glycidyl methacrylate in 140 ml. of acetone in a reaction flask and heated at 50° C. under a blanket of nitrogen, there was added 5% based on the weight of the monomers of 2,2'-azobisisobutyronitrile dissolved in acetone. The reaction mixture was heated to reflux and held at this temperature two hours. The catalyst and unreacted monomers were separated from the polymer by pouring the reaction mixture into ice water, decanting the liquid and redissolving the polymer in acetone. A solution of 0.1 gram of the copolymer in 100 ml. of acetone at 30° C. showed an inherent viscosity of 0.26. Thereafter, the acetate salt was formed by dissolving the product to a concentration of 5% in a 10% solution of acetic acid.

After drying by heating to a temperature of about 100° C., and maintaining this temperature for about 3 minutes, the film impregnated with the polymer was coated with an aqueous dispersion of a copolymer of vinylidene chloride, methyl acrylate and itaconic acid. The coating composition was prepared from the following ingredients:

| | Parts |
|---|---|
| Water | 400 |
| Vinylidene chloride | 380 |
| Methyl acrylate | 20 |
| Itaconic acid | 8 |
| "Duponol" ME (sodium lauryl sulfate) | 8 |
| "Darvin" #1 (condensation product of sodium beta naphthalene sulfonate and formaldehyde) | 4 |
| Ammonium persulfate | 2 |
| Meta-sodium bisulfite | 1 |

The water, ammonium persulfate and "Duponol" ME were placed in a round-bottom vessel. The vessel, fitted with a reflux condenser and a stirrer, was immersed in a water bath maintained at 33° C.–34° C. After stirring until solution was complete, the premixed monomers (vinylidene chloride, methyl acrylate and itaconic acid) were added followed by the addition of the meta-sodium bisulfite. Polymerization was accomplished by refluxing at the prevailing temperature, 33° C.–34° C. After 1½ hours, refluxing ceased indicating the polymerization was substantially complete. Stirring was continued for another 30 minutes to assure complete polymerization. "Darvan" #1 was then added to the dispersion.

The dispersion was coated on both sides of the regenerated cellulose film by passing the film through a dip tank containing the dispersion. The coated film was then passed through doctor rolls to remove excess bath and to meter the desired quantity of the dispersion onto the film. Immediately after leaving the doctor rolls, the wet coated film was conducted vertically through a bank of smoothing rolls consisting of twelve 2" diameter polished rolls placed tangentially to the film and alternately located six on each side of the film as shown in application Serial No. 764,889, filed October 2, 1958, now Patent No. 2,977,243, to J. W. Meier, and assigned to the assignee of the present application. The rolls were rotated with a peripheral speed equal to 75% of the film speed in a direction opposite to that of the moving film. The film was then passed through a vertical drier to remove excess moisture and was then wound as a roll. Six grams per square meter of the vinylidene chloride copolymer was applied to the film in this manner at a speed of 150 yards per minute. The coated film was highly transparent and free of coating striations.

As one control, A, the sheet of gel regenerated cellulose was passed prior to drying through an aqueous bath containing 7% of ethylene glycol only, the acetate salt of the terpolymer was omitted. The dried film was found to hvae a rate of swelling of 11% per second and a contact angle of 45 degrees. When the identical aqueous coating dispersion as in the example was applied, the resulting coated film was characterized by an excessive number of coating striations.

*Example 2*

The terpolymer used in this example was prepared in the manner described for Example 1. A monomer charge consisting of 75 grams of methyl methacrylate, 25 grams of 2-diethylaminoethyl acrylate and 10 grams of glycidyl methacrylate was dissolved in acetone to form a 50% solution. The 50% acetone solution of the monomers was placed in a reaction flask and heated to 50° C. under a blanket of nitrogen. After cooling, the terpolymer was isolated from the reaction mixture and its inherent viscosity was measured. The inherent viscosity was about 0.3.

A sheet of gel regenerated cellulose film was treated with an aqueous solution containing 5% of the terpolymer and 7% of ethylene glycol. After drying, the sheet was found to contain 1.0 gram per square meter of the polymer. When tested, it displayed an initial rate of thickness swelling of 1.8% per second and a contact angle of 60 degrees. An aqueous polymeric coating dispersion could be applied satisfactorily.

*Example 3*

A terpolymer was prepared following the procedure described under Example 1. The monomer charge consisted of 65 grams of methyl acrylate, 25 grams of 2-diethylaminoethyl methacrylate and 10 grams of glycidyl methacrylate and the inherent viscosity of the polymer was about 0.3.

An aqueous solution containing 5% of the acetate salt of the terpolymer and 7% of ethylene glycol was impregnated into a sheet of gel cellophane to give a treated product containing 1.0 gram per square meter of the terpolymer in the dried film and 15% by weight of ethylene glycol. The treated film showed a swelling rate of 1.6% per second and the film had a contact angle of 62 degrees.

*Examples 4–6*

The acetate salt of the terpolymer described in Example 1 was made up to concentrations of 1.2%, 4.5% and 5.9% in aqueous solutions and applied to sheets of gel cellophane to give treated products containing 0.11 gram of the terpolymer per square meter, 0.62 gram of the terpolymer per square meter, and 0.85 gram of the terpolymer per square meter, respectively. Corresponding thickness swelling rates for these examples were 2.8%, 1.5% and 1.1%, respectively.

*Example 7*

A 50% acetone solution of diethylaminoethyl methacrylate and methyl methacrylate (1:1 mole ratio) was placed in a reaction flask. The reaction flask was flushed with nitrogen and, under a continuing blanket of nitrogen, there was added to the reactants 1.5 grams of 2,2'-azobisisobutyronitrile and the reaction mixture was heated at reflux for 2 hours. The reaction mixture was poured into ice water. The liquid portion was decanted and the solid polymer which separated was dissolved in a 10% aqueous acetic acid solution.

An impregnating solution was prepared by making up the copolymer in acetic acid solution to 5% solids and ethylene glycol was added to the extent of 7% by weight in the impregnating bath. A sheet of gel cellophane film was impregnated, excess impregnants were removed and the sheet was dried. The dried sheet contained 1.8 grams per square meter of the salt of the copolymer. It displayed a rate of thickness swelling of 3.7% per second and a contact angle of 65 degrees.

*Example 8*

A solution of 30 grams of 2-dipropylaminoethyl methacrylate, 105 grams of pinacolyl acrylate, 10 grams of glycidyl acrylate and 1.0 gram of di-tertiary-butyl peroxide in 200 ml. of acetone was heated at reflux under a blanket of nitrogen for 6 hours. The reaction product was poured into ice water. The solid polymer product, which separated, was dissolved in acetone. A solution of 0.1 gram of the terpolymer in 100 ml. of acetone at 30° C. showed an inherent viscosity of 0.34.

An aqueous solution containing 5% of the acetate salt of this terpolymer and 7% of ethylene glycol was impregnated into a sheet of gel cellophane to give a treated product containing 0.55 gram per square meter of the dried film. The treated film showed a swelling rate of 1% per second and a contact angle of 70 degrees. A control film that did not contain the polymer displayed a swelling rate of 9% per second and a contact angle of 45 degrees.

*Example 9*

The procedure of the preceding example was repeated with equivalent amounts of 2-dimethylaminoethyl acrylate (21 grams), tertiary-butyl methacrylate (82 grams) and glycidyl methacrylate (10 grams).

A treated cellophane film containing 0.70 gram of the resin per square meter showed a swelling rate of 0.9% per second and a contact angle of 70 degrees. A control displayed a rate of swelling of 9.5 percent per second and a contact angle of 45 degrees.

*Example 10*

A solution of 32 grams of 2-di-n-butylaminoethyl methacrylate, 108 grams of neopentyl methacrylate, 10 grams of glycidyl methacrylate and 5 grams of dimethyl alpha, alpha'-azodiisobutyrate in 200 ml. of acetone was heated at reflux under nitrogen for 3 hours, following the procedure of Example 1. The isolated terpolymer showed an inherent viscosity of 0.42 (0.1 gram in 100 ml. of acetone at 100° C.).

A treated cellophane sheet containing 0.82 gram per square meter of the terpolymer and 15% by weight of ethylene glycol showed a rate of swelling of 8% per second and a contact angle of 72 degrees.

As shown in the examples, only certain of the methacrylates and acrylates are useful in the present invention. It is believed that the high melting point of the polymers obtained using the methyl, pinacolyl, tetrabutyl and neopentyl acrylates and methacrylates is the key to this success.

Having fully disclosed the invention, what is claimed is:

1. In a process for improving the properties of regenerated cellulose film wherein the regenerated cellulose film is cast, purified, softened, dried and coated with a coalescible film-forming material from an aqueous dispersion of said material and the coating is then smoothed and dried, the improvement which comprises applying to said film after purification but prior to the first drying step an aqueous solution containing a water-soluble salt of a polymer obtained from 20 to 30 percent by weight of at least one dialkylaminoethyl acrylate having the formula

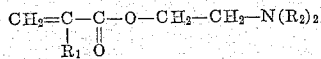

and 70 to 80 percent by weight of at least one acrylic ester having the formula

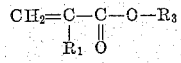

wherein
$R_1$ is selected from the group consisting of hydrogen and methyl,
$R_2$ is an alkyl group of 1–6 carbons atoms,
$R_3$ is selected from the group consisting of methyl, pinacolyl, tertiary butyl and neopentyl,
said polymer having an inherent viscosity of 0.1–1.0, said salt being formed with a fatty acid having up to six carbon atoms; removing excess solution; and, thereafter, heating said film under controlled conditions of temperature and time to dry the film and insolubilize the polymer; and then applying to said film a coalescible film-forming material from an aqueous dispersion thereof.

2. In a process for improving the properties of regenerated cellulose film wherein the regenerated cellulose film is cast, purified, softened, dried and coated with a coalescible film-forming material from an aqueous dispersion of said material and the coating is then smoothed and dried, the improvement which comprises applying to said film after purification but prior to the first drying step an aqueous solution containing a water-soluble salt of a polymer obtained from 20 to 30 percent by weight of at least one dialkylaminoethyl acrylate having the formula

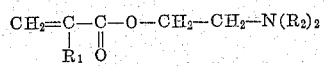

70 to 80 percent by weight of at least one acrylic ester having the formula

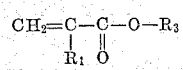

and up to 15 percent, based on the weight of the dialkylaminoethyl acrylate and the acrylic ester, of at least one epoxized acrylic ester having the formula

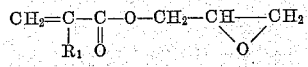

wherein
$R_1$ is selected from the group consisting of hydrogen and methyl,
$R_2$ is an alkyl group of 1–6 carbon atoms,
$R_3$ is selected from the group consisting of methyl, pinacolyl, tertiary butyl and neopentyl,
said polymer having an inherent viscosity of 0.1–1.0, said salt being formed with a fatty acid having up to six carbon atoms; removing excess solution; and, thereafter, heating said film under controlled conditions of temperature and time to dry the film and insolubilize the polymer; and then applying to said film a coalescible film-forming material from an aqueous dispersion thereof.

3. A process as in claim 2 wherein the dialkylaminoethyl acrylate is diethylaminoethyl methacrylate.

4. A process as in claim 2 wherein the dialkylaminoethyl acrylate is diethylaminoethyl acrylate.

5. A process as in claim 2 wherein the acrylic ester is methyl methacrylate.

6. A process as in claim 2 wherein the acrylic ester is methyl acrylate.

7. A process as in claim 2 wherein the epoxized acrylic ester is glycidyl methacrylate.

8. A process as in claim 2 wherein the fatty acid used to form the salt is acetic acid.

9. A process as in claim 2 wherein said film is heated to a temperature of 85° C.–120° C. for 0.5–5.0 minutes after said aqueous solution containing the water-soluble salt of the polymer has been applied.

10. A process as in claim 2 wherein 0.3–3.0 grams per square meter of said insoluble polymer is applied to said film.

11. A process as in claim 2 wherein said coalescible film-forming material is a copolymer of vinylidene chloride with at least one other mono-olefinic monomer copolymerizable with vinylidene chloride.

12. A process as in claim 11 wherein said aqueous dispersion contains 5%–65% of said vinylidene chloride copolymer.

13. A hydrophilic organic polymeric article coated with 0.1–3.0 grams per square meter of an insoluble polymer obtained from 20 to 30 percent by weight of at least one dialkylaminoethyl acrylate having the formula

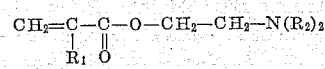

70 to 80 percent by weight of at least one acrylic ester having the formula

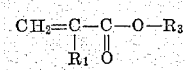

and up to 15 percent, based on the weight of the dialkylaminoethyl acrylate and the acrylic ester, of at least one epoxized acrylic ester having the formula

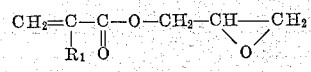

wherein
$R_1$ is selected from the group consisting of hydrogen and methyl,
$R_2$ is an alkyl group of 1–6 carbon atoms,
$R_3$ is selected from the group consisting of methyl, pinacolyl, tertiary butyl and neopentyl,
said polymer having an inherent viscosity of 0.1–1.0, said article having a contact angle upon wetting with water of less than 75 degrees and an initial rate of thickness swelling of less than 4.5% per second in water.

14. A regenerated cellulose article coated with 0.1–3.0 grams per square meter of an insoluble polymer obtained from 20 to 30 percent by weight of at least one dialkyl-aminoethyl acrylate having the formula $$CH_2=C-C-O-CH_2-CH_2-N(R_2)_2$$
$$\phantom{CH_2=}|\ \|$$
$$\phantom{CH_2=}R_1\ O$$

70 to 80 percent by weight of at least one acrylic ester having the formula $$CH_2=C-C-O-R_3$$
$$\phantom{CH_2=}|\ \|$$
$$\phantom{CH_2=}R_1\ O$$

and up to 15 percent, based on the weight of the dialkyl-aminoethyl acrylate and the acrylic ester, of at least one epoxized acrylic ester having the formula $$CH_2=C-C-O-CH_2-CH\!-\!-\!-\!CH_2$$
$$\phantom{CH_2=}|\ \|\phantom{-O-CH_2-}\backslash\!\!\diagup$$
$$\phantom{CH_2=}R_1\ O\phantom{-O-CH_2-CH}O$$

wherein $R_1$ is selected from the group consisting of hydrogen and methyl,
$R_2$ is an alkyl group of 1–6 carbon atoms,
$R_3$ is selected from the group consisting of methyl, pinacolyl, tertiary butyl and neopentyl, said polymer having an inherent viscosity of 0.1–1.0, said article having a contact angle upon wetting with water of less than 75 degrees and an initial rate of thickness swelling of less than 4.5% per second in water.

15. A regenerated cellulose film coated with 0.1–3.0 grams per square meter of an insoluble polymer obtained from 20 to 30 percent by weight of at least one dialkyl-aminoethyl acrylate having the formula $$CH_2=C-C-O-CH_2-CH_2-N(R_2)_2$$
$$\phantom{CH_2=}|\ \|$$
$$\phantom{CH_2=}R_1\ O$$

70 to 80 percent by weight of at least one acrylic ester having the formula $$CH_2=C-C-O-R_3$$
$$\phantom{CH_2=}|\ \|$$
$$\phantom{CH_2=}R_1\ O$$

and 5 to 15 percent, based on the weight of the dialkyl-aminoethyl acrylate and the acrylic ester, of at least one epoxized acrylic ester having the formula $$CH_2=C-C-O-CH_2-CH\!-\!-\!-\!CH_2$$
$$\phantom{CH_2=}|\ \|\phantom{-O-CH_2-}\backslash\!\!\diagup$$
$$\phantom{CH_2=}R_1\ O\phantom{-O-CH_2-CH}O$$

wherein $R_1$ is selected from the group consisting of hydrogen and methyl,
$R_2$ is an alkyl group of 1–6 carbon atoms,
$R_3$ is selected from the group consisting of methyl, pinacolyl, tertiary butyl and neopentyl, said polymer having an inherent viscosity of 0.1–1.0, said film having a contact angle upon wetting with water of less than 75 degrees and an initial rate of thickness swelling of less than 4.5% per second in water.

16. A regenerated cellulose film coated with 0.1–3.0 grams per square meter of an insoluble polymer obtained from 20 to 30 percent by weight of at least one dialkyl-aminoethyl acrylate having the formula $$CH_2=C-C-O-CH_2-CH_2-N(R_2)_2$$
$$\phantom{CH_2=}|\ \|$$
$$\phantom{CH_2=}R_1\ O$$

70 to 80 percent by weight of at least one acrylic ester having the formula $$CH_2=C-C-O-R_3$$
$$\phantom{CH_2=}|\ \|$$
$$\phantom{CH_2=}R_1\ O$$

and 5 to 15 percent, based on the weight of the dialkyl-aminoethyl acrylate and the acrylic ester, of at least one epoxized acrylic ester having the formula $$CH_2=C-C-O-CH_2-CH\!-\!-\!-\!CH_2$$
$$\phantom{CH_2=}|\ \|\phantom{-O-CH_2-}\backslash\!\!\diagup$$
$$\phantom{CH_2=}R_1\ O\phantom{-O-CH_2-CH}O$$

wherein $R_1$ is selected from the group consisting of hydrogen and methyl,
$R_2$ is an alkyl group of 1–6 carbon atoms,
$R_3$ is selected from the group consisting of methyl, pinacolyl, tertiary butyl and neopentyl, said polymer having an inherent viscosity of 0.1–1.0, coated with a copolymer of vinylidene chloride with at least one other mono-olefinic monomer copolymerizable with vinylidene chloride.

17. In a process for improving the properties of a hydrophilic organic polymeric article wherein the article is cast, purified, softened, dried and coated with a coalescible film-forming material from an aqueous dispersion of said material and the coating is then smoothed and dried, the improvement which comprises applying to said article after purification but prior to the first drying step an aqueous solution containing a water-soluble salt of a polymer obtained from 20 to 30 percent by weight of at least one dialkylaminoethyl acrylate having the formula $$CH_2=C-C-O-CH_2-CH_2-N(R_2)_2$$
$$\phantom{CH_2=}|\ \|$$
$$\phantom{CH_2=}R_1\ O$$

70 to 80 percent by weight of at least one acrylic ester having the formula $$CH_2=C-C-O-R_3$$
$$\phantom{CH_2=}|\ \|$$
$$\phantom{CH_2=}R_1\ O$$

and 5 to 15 percent, based on the weight of the dialkyl-aminoethyl acrylate and the acrylic ester, of at least one epoxized acrylic ester having the formula $$CH_2=C-C-O-CH_2-CH\!-\!-\!-\!CH_2$$
$$\phantom{CH_2=}|\ \|\phantom{-O-CH_2-}\backslash\!\!\diagup$$
$$\phantom{CH_2=}R_1\ O\phantom{-O-CH_2-CH}O$$

wherein $R_1$ is selected from the group consisting of hydrogen and methyl,
$R_2$ is an alkyl group of 1–6 carbon atoms,
$R_3$ is selected from the group consisting of methyl, pinacolyl, tertiary butyl and neopentyl, said polymer having an inherent viscosity of 0.1–1.0, said salt being formed with a fatty acid having up to six carbon atoms; removing excess solution; and, thereafter, heating said article under controlled conditions of temperature and time to dry the article and insolubilize the polymer; and then applying to said article a coalescible film-forming material from an aqueous dispersion thereof.

18. A process which comprises applying to a gel regenerated cellulose film an aqueous solution containing 1%–10% of a water-soluble polymeric salt of a fatty acid having up to six carbon atoms, the polymer obtained from 20 to 30 percent by weight of at least one dialkylaminoethyl acrylate having the formula $$CH_2=C-C-O-CH_2-CH_2-N(R_2)_2$$
$$\phantom{CH_2=}|\ \|$$
$$\phantom{CH_2=}R_1\ O$$

70 to 80 percent by weight of at least one acrylic ester having the formula $$CH_2=C-C-O-R_3$$
$$\phantom{CH_2=}|\ \|$$
$$\phantom{CH_2=}R_1\ O$$

and 5 to 15 percent, based on the weight of the dialkyl-aminoethyl acrylate and the acrylic ester, of at least one epoxized acrylic ester having the formula $$CH_2=C-C-O-CH_2-CH\!-\!-\!-\!CH_2$$
$$\phantom{CH_2=}|\ \|\phantom{-O-CH_2-}\backslash\!\!\diagup$$
$$\phantom{CH_2=}R_1\ O\phantom{-O-CH_2-CH}O$$

wherein $R_1$ is selected from the group consisting of hydrogen and methyl,
$R_2$ is an alkyl group of 1–6 carbon atoms,
$R_3$ is selected from the group consisting of methyl, pinacolyl, tertiary butyl and neopentyl, said polymer having an inherent viscosity of 0.1–1.0, to impregnate said film with 0.1–3.75 grams per square meter of said water-soluble polymeric salt; removing excess solution; heating said treated film to a temperature of 85° C.–120° C. for a time between 0.5 and 5.0 minutes sufficient to convert said water-soluble polymeric salt to 0.1–3.0 grams per square meter of the corresponding insoluble polymer; thereafter, coating said treated film with an aqueous dispersion containing 5%–65% of a coalescible, organic, polymeric, film-forming material; removing excess dispersion from the regenerated cellulose film; smoothing said dispersion on the surface of the regenerated cellulose film and drying the coated film.

References Cited by the Examiner

UNITED STATES PATENTS

| | | | |
|---|---|---|---|
| 2,138,763 | 11/38 | Graves | 260—86.1 |
| 2,169,366 | 8/39 | Meigs | 117—145 X |
| 2,316,274 | 4/43 | Mitchell | 117—145 X |
| 2,350,366 | 6/44 | Mitchell | 117—145 |
| 2,650,172 | 8/53 | Brillhart | 117—145 X |
| 2,819,984 | 1/58 | Ackerman | 117—76 |
| 2,880,116 | 3/59 | Alps et al. | 117—76 |
| 2,909,449 | 10/59 | Banigan | 117—145 |
| 2,910,459 | 10/59 | Rothrock et al. | 117—161 X |

RICHARD D. NEVIUS, *Primary Examiner.*

JOSEPH B. SPENCER, *Examiner.*